| United States Patent [19] | [11] Patent Number: 4,491,571 |
| Suzuki et al. | [45] Date of Patent: Jan. 1, 1985 |

[54] PROCESS FOR PRODUCING HYDROGEN FLUORIDE

[75] Inventors: Kaichiro Suzuki; Keiichi Nakaya, both of Chiba; Tomohiro Gotoh, Ichihara; Masayuki Kitasako, Ichihara; Masaharu Iwasaki, Ichihara, all of Japan

[73] Assignee: Asahi Glass Company Ltd., Tokyo, Japan

[21] Appl. No.: 501,119

[22] Filed: Jun. 6, 1983

[30] Foreign Application Priority Data

Jun. 11, 1982 [JP] Japan .................................. 57-99130
Aug. 27, 1982 [JP] Japan ................................ 57-147828

[51] Int. Cl.$^3$ .............................................. C01B 7/19
[52] U.S. Cl. .................................... 423/485; 423/555
[58] Field of Search ............... 423/178, 482, 483, 638, 423/639, 555, 485

[56] References Cited

U.S. PATENT DOCUMENTS 3,825,655  7/1974  Eipeltauer et al. ................. 423/555
4,010,245  3/1977  Spreckelmeyer et al. .......... 423/555

Primary Examiner—Earl C. Thomas
Assistant Examiner—Jeffrey E. Russel
Attorney, Agent, or Firm—Oblon, Fisher, Spivak, McClelland & Maier

[57] ABSTRACT

A process for producing hydrogen fluoride with use of fluorite as starting material and by conducting reactions in a first reactor and a second reactor wherein a reaction of fluorite with sulfuric acid, sulfuric anhydride and steam in the first reactor is conducted at a conversion of from 35 to 90% while maintaining the reaction temperature within a range of from 140° to 240° C. by controlling the respective amounts of the sulfuric anhydride, steam and sulfuric acid.

14 Claims, No Drawings

PROCESS FOR PRODUCING HYDROGEN FLUORIDE

The present invention relates to a process for producing hydrogen fluoride. More particularly, it relates to an improved process for producing hydrogen fluoride comprising a first reaction and a second reaction.

A conventional method which is practically employed for the production of hydrogen fluoride on an industrial scale is the process disclosed in Japanese Patent Publication No. 8636/1974 wherein fluorite and sulfuric acid are mixed in their entire amounts in a mixer and reacted as a paste or as a slurry. A portion of the resulting hydrogen fluoride is withdrawn while unreacted fluorite, sulfuric acid and gypsum are supplied as a reaction product to a rotary kiln. The rest of the reaction is conducted in the rotary kiln taking a long period of time to complete the reaction, to obtain hydrogen fluoride and gypsum.

In another conventional method, as disclosed in Japanese Patent Publication No. 652/1967, the reaction with fluorite is conducted in a fluidized bed etc. in the presence of $SO_3$, $H_2O$ and $H_2SO_4$.

However, the first-mentioned method has the following drawbacks.

(1) The mixture of the feed materials in the mixer tends to be highly viscous, and it is necessary to use a special kneader having a complicated structure specifically designed to attain uniform mixing of the fluorite and sulfuric acid, whereby a considerable cost will be required for the mixer. (2) The above-mentioned mixer is primarily intended to attain uniform mixing of the fluorite and sulfuric acid, so that the reaction of the fluorite with sulfuric acid in the mixer proceeds only at a rate of from 20 to 30% and the major reaction is conducted subsequently in a rotary kiln at a temperature of from 250° to 300° C. Accordingly the majority of the heat required for the reaction is supplied from outside of the kiln by an external heating system. However, the reaction in the rotary kiln requires a long period of time because the reactants are viscous and tend to deposit on the inner wall of the rotary kiln and the heat hardly penetrates to the interior. Accordingly a great amount of heat has to be supplied and consequently a large installation is required.

On the other hand, the latter method disclosed in Japanese Patent Publication No. 652/1967 is designed to complete the reaction in a single step, and in order to avoid excessive enlargement of the apparatus for an industrial application, it is necessary to increase the reaction rate. However, as disclosed in the publication at page 4 in the right hand side column, "in order to increase the reaction rate, the reaction temperature should be 300° C. or higher . . . ." Thus it is necessary to increase the reaction temperature in order to improve the reaction rate. This means that it is necessary to use an expensive material for the apparatus and, as such, the method is not suitable for an industrial application. Further, in the examples of the same patent publication, it is disclosed that in the reaction zone, the reaction temperature is from 250° to 330° C. and in some examples wherein no reaction temperature is disclosed, the reaction temperature is presumably within the similar temperature range in view of the amounts of the supplied feed materials. However, it is usually difficult to utilize the heat of reaction released by the reaction of expensive $SO_3$ gas with $H_2O$ in order to facilitate the reaction, and to maintain high temperature conditions. Further the amount of $H_2SO_4$ gas discharged with the generated HF gas increases and therefore it becomes necessary to increase the heat supplied to the system. This, in turn, normally has required the use of a great amount of $SO_3$ in order to generate more heat by its reaction with water. Furthermore, the operation for separating the $H_2SO_4$ gas accompanying the HF gas will be cumbersome. If, in order to avoid such difficulties, the reaction temperature is maintained at a level of not higher than e.g. 200° C., the reaction speed will be slow as mentioned above, and accordingly, in order to thereby complete the reaction of the fluorite with the sulfuric acid component, a large volume for the reactor will be required and it will be impractical for an industrial operation to have such an apparatus having a large capacity.

As a result of extensive research to overcome the above difficulties, the present inventors have found that by employing a two step reaction and by replacing a part of sulfuric acid in the first reaction step with sulfuric anhydride and steam, it is possible to attain a high rate of reaction even within a temperature range of from 140° to 250° C. in the range of a low conversion, and when the conversion is rapidly brought to a level of at least 35% at a reaction temperature of from 140° to 240° C., preferably from 160° to 200° C., the solid reaction product thereby obtained becomes granular and does not form a viscous reaction product which used to be a problem in the conventional processes. The present invention has been accomplished based on this discovery.

The present invention provides a process for producing hydrogen fluoride with use of fluorite as starting material and for conducting the reaction in a first reactor and a second reactor, which is characterized in that the reaction of fluorite with sulfuric acid, sulfuric anhydride and steam in the first reactor is conducted at a conversion of from 35 to 90% while maintaining the reaction temperature within a range of from 140° to 240° C. by controlling the respective amounts of the sulfuric anhydride, steam and sulfuric acid.

Namely, it is a feature of the present invention, as opposed to the conventional processes in which fluorite and sulfuric acid are used as sole feed materials, that a part of the sulfuric acid introduced as a feed material to the first reactor is replaced by sulfuric anhydride ($SO_3$) and steam, and the reaction temperature and conversion of the fluorite in the first reactor are brought to from 140° to 240° C. and from 35 to 90%, respectively, by controlling the supply of the sulfuric anhydride and steam, and the rest of reaction is conducted in the second reactor having an external heating system to complete the reaction.

Now, the present invention will be described in detail with reference to the preferred embodiments.

According to the present invention, in the first reactor, the reaction temperature is brought to from 140° to 240° C., preferably from 160° to 240° C., more preferably from 160° to 200° C., by an internal heating by virtue of the heat of reaction generated by the reaction of sulfuric anhydride and steam, and the conversion of the fluorite is brought to from 35 to 90%, preferably from 45 to 80%, more preferably from 55 to 80%, whereby it is possible to prevent the deposition of a viscous substance in both the first reactor and the second reactor. Further, the solid reaction product is granular, whereby heat transmission is facilitated, and accordingly the heat required for the rest of the reaction in the second step can readily be supplied from a relatively inexpensive heat source without requiring utilization of the heat of reaction of expensive SO₃ and H₂O, for instance, by heating the rotary kiln from the outside by the heat of combustion of fuel oil, whereby the reaction can readily be facilitated. The reaction product obtained by the first reaction is not viscous; thus the reaction in the second reactor can be performed with applied heat, and accordingly the heating can efficiently be conducted to perform the reaction in a reactor which may be more compact than the conventional second reactor. The reactor is not necessarily limited to a rotary kiln of an external heating type. For instance, it is possible to use a rotary furnace having a steam tube heating system or any other apparatus of an external type which is commonly employed.

Now, the first reaction will be described in further detail.

When the reaction is conducted in the conventional mixer, fluorite and sulfuric acid required for the reaction are introduced in their total amounts, and accordingly a special design is required to ensure adequate stirring in the mixer.

The present inventors have studied the method of adding the sulfuric acid component to the fluorite and have found that good results are obtainable in the following manner. Namely, sulfuric acid as a feed material is supplied partially in the form of sulfuric anhydride and steam, and when the feed materials are supplied, it is preferred that the reaction is initially started by the fluorite, sulfuric anhydride and steam and almost simultaneously or shortly thereafter, the rest of the sulfuric acid component required for the reaction of the fluorite in the first reactor is supplied in the form of sulfuric acid, fuming sulfuric acid, fluorosulfuric acid recovered from the purification process of hydrofluoric acid or a mixture thereof, whereby the reaction is performed while maintaining the reaction temperature at a level of from 140° to 240° C., preferably from 160° to 240° C., more preferably from 160° to 200° C. It is desirable that the above-mentioned rest of the sulfuric acid component and the fluorite are mixed as promptly as possible. Specifically, it is preferred to use a mixer of the type capable of providing a large surface area for the powder layer, such as a paddle-type mixer or a ribbon-type mixer. The reason is that it is preferred not to excessively increase the amount of sulfuric acid per unit surface area and not to excessively increase the linear velocity of the formed HF gas. Under these conditions, the reaction is performed at a conversion of from 35 to 90%, preferably from 45 to 80%, more preferably from 55 to 80%, and the solid product thereby obtained is, if required after supplementing the sulfuric acid component, introduced into the second reactor in which a further reaction is performed. The heat required for the reaction in the second reactor is supplied by an indirect heating by means of e.g. the heat of combustion of fuel oil in addition to the heat of reaction of the sulfuric anhydride with steam, and the reaction is conducted at a temperature from 150° to 300° C., preferably from 180° to 250° C., whereby hydrogen fluoride gas is produced from fluorite as starting material without formation of a viscous solid product by using an inexpensive heat source without relying on the heat of reaction of sulfuric anhydride and steam for the majority of the heat required for the reaction and by means of a compact apparatus.

The control of the reaction rate in the first reactor may be conducted either by adjusting the amounts of addition of the sulfuric acid components i.e. the SO₃ gas, sulfuric acid and/or fuming sulfuric acid, relative to the fluorite to the proportions required to bring the conversion to a predetermined level, or by adjusting the residence time of the powder in the reactor to bring the conversion to a predetermined level. In the former method, at the time of transferring the reaction product to the second reactor, the sulfuric acid component required for the reaction of the fluorite in the second reactor is added.

In each case, it is necessary to maintain the reaction temperature in the first reactor at a level of from 140° to 240° C., preferably from 160° to 240° C., more preferably from 160° to 200° C.

For this purpose, there is a preferable relationship among the particle size of the fluorite particles, the degree of the replacement of the sulfuric acid with sulfuric anhydride and steam and the supply rate of the sulfuric anhydride and steam.

With respect to the particle size of the fluorite, the average particle size is preferably from 30 to 100 μm. If the average particle size is greater than 100 μm, the reaction in the interior of the fluorite particles becomes difficult and does not proceed simultaneously with the reaction on the particle surface. On the other hand, if the average particle size is less than 30 μm, fine particles tend to be scattered by the generated gas although there will be no problems in performing the reaction at the particle surfaces and the reaction in the interior of the particle will proceed simultaneously. Further, it is industrially impractical to pulverize the fluorite to such an extent. A more preferred range of the average particle size is from 40 to 80 μm.

Further, the problems relating to the material of the apparatus, particularly the material of the agitator, to be used for the reaction of the fluorite with sulfuric anhydride, steam and sulfuric acid, are very important for the industrial operation of the process. As a result of extensive research to solve these problems, the present inventors have found that when the reaction conditions are controlled such that a film coating of the product is formed on the surface of the agitator for the prevention of corrosion within the reactor, even steel exhibits adequate corrosion resistance within a temperature range of from 140° to 240° C. so long as the coated film of product is maintained.

The atmosphere within the reactor is a high temperature atmosphere wherein hydrofluoric acid, sulfuric acid, sulfuric anhydride, etc., are present and besides the apparatus is subjected to abrasion due to the friction with the solid particles. Because of the combination of these adverse effects, it is hardly possible to find a corrosion resistant material which can be used for the industrial operation. The present inventors have conducted a number of experiments and, as a result, have found that the corrosion of the material of the agitator can substantially be controlled by forming on the surface of the agitator a scale film composed of the feed materials and/or the reaction product. This mechanism is not clearly understood. However, it is conceivable that within such a temperature range, the surface of the agitator located inside of the scale film is separated from the corrosive atmosphere and at the same time the abrasion due to the friction with the solid particles is thereby avoided, and thus the corrosion is prevented by these two factors. It has been further found that a specific condition is desirable to always form such a coating film on the surface of the rotating vanes of the agitator.

Namely, in order to facilitate the renewal of the surface portion of the powder layer by mixing it with the interior portion, it is usual, in many cases, to maintain the level of the fluidized powder layer below the upper end of the stirring vanes to impart the effect of the stirring vanes adequately to the surface layer. However, when the reaction is performed in such a state, it has been found impossible to maintain the scale film although the reason is not clearly understood. Consequently, the corrosion and wearing of the apparatus are considerable, and it has been found that such an apparatus can not practically be used as an industrial apparatus. However, when the level of the powder layer is adjusted to such a condition where the scale of the products forms on the surface of the materials and the stirring vanes are adapted to be always located in the fluidized powder layer while maintaining such a condition that the powder layer is sufficiently stirred, it has been surprisingly found that not only the feed materials can adequately be mixed, but also a scale film is formed on the entire surface of the stirring vanes, whereby almost no corrosion proceeds even when steel material, which is generally believed to be impractical for use in the above-mentioned corrosive atmosphere, is employed. Further, it has been found that the formation of aggregates due to insufficient mixing of the fluorite with sulfuric acid at the surface of the powder layer, which was expected to be likely under such a condition, does not take place and the protecting scale adequately forms on the vanes so long as the depth from the surface of the powder layer to the upper ends of the stirring vanes is maintained within a range of from about 1 to 30%, preferably from 2 to 20%, more preferably from 2 to 10%, of the rotational diameter of the front ends of the vanes. Furthermore, it has been found that when sulfuric acid is locally added, not only the mixing with the fluorite tends to be inadequate, but also an adverse effect is brought about to the protecting film on the vane surface, and accordingly, the supply rate of sulfuric acid should preferably be within a range of from 500 to 5000 kg/m².hr, more preferably from 700 to 3000 kg/m².hr. Further, in this case, it is preferred to avoid the direct contact of the vanes with sulfuric acid, and this can be done by forming the protecting film on the vanes. It is also preferred to conduct the mixing of the fluorite with sulfuric acid as rapidly as possible. Accordingly, the speed of the stirring vanes should be such as to maintain the protecting scale on the vane surfaces, with the peripheral speed of the front ends of the vanes usually being from 20 to 150 m/min, preferably from 40 to 100 m/min, more preferably from 50 to 80 m/min. If the peripheral speed is faster than this range, the abrasion of the front ends of the stirring vanes will be facilitated. On the other hand, if the peripheral speed is too slow, no adequate stirring can be done. Further, the distance between the adjacent stirring vanes or the distance between the vanes and the case during the rotation of the vanes should not be so small as to lead to the peeling of the protecting film. As a result of the experiments, it has been found that the minimum distance between the rotating vanes and the case should be at least 3 mm, preferably at least 5 mm.

Now, the proportion of the sulfuric acid to be replaced by sulfuric anhydride and steam, and the conditions for their addition will be described.

There is an interrelation between the above-mentioned proportion, the conditions for the addition and the reaction temperature. In any case, it is desirable that the reaction at the external surface of the fluorite particles should promptly be completed under such a state that the amount of sulfuric acid around the surface of the fluorite particles is not so great and at the same time the reaction at the interior of the particles should gradually proceed. Namely, if the reaction at the exterior surface of the particles is completed and the surface is converted to gypsum, the adhesion of the particles to one another tends to hardly occur, and for this reason, the reaction at the surface should be completed as swiftly as possible and at the same time, in order to facilitate the completion of the reaction at the interior of the particles, it is necessary to change the fluorite to gypsum also in the interior of the particles around the pores constituting passages for incoming sulfuric acid.

For this purpose, the proportion of sulfuric acid to be replaced with sulfuric anhydride and steam is adjusted to bring the reaction temperature to from 140° to 240° C., preferably from 160° to 240° C., more preferably from 160° to 200° C. Further, it is preferred that the addition of sulfuric anhydride and steam precedes the addition of sulfuric acid, whereby suitable amounts of sulfuric anhydride and steam readily penetrate into the interior of the fluorite particles by adjusting the proportion of the replacement to the above-mentioned range. In order to facilitate the penetration of these gases into the interior, it is necessary that the surface of the particles does not become tacky. In other words, it is preferred that in the initial stage of the reaction, sulfuric acid is added in a relatively small amount and the supply of the sulfuric anhydride and steam should be completed as soon as possible. The actual supply rates of these feed materials vary depending upon the type and capacity of the first reactor and the amount of fluorite. When a double-shaft paddle agitator type reactor is used as the first reactor and the fluorite is continuously supplied, the residence time of the fluorite in the first reactor is about 30 minutes according to the present invention, and sulfuric anhydride and steam should preferably be added for the initial period of from 0 to 15 minutes and sulfuric acid is added for a period of from 3 to 20 minutes. During the stage in the above-mentioned period wherein sulfuric acid and sulfuric anhydride and steam are simultaneously added, it is preferred that sulfuric acid is supplied in a relatively small amount, and after the completion of the addition of sulfuric anhydride and steam, it is added in a relatively large amount.

It is usually conceivable to supply sulfuric anhydride and steam from the bottom of the fluidized bed to pass them through the powder layer. However, such a method involves many problems including clogging of the nozzles. As a result of various experiments, the present inventors have found it possible to control and maintain the temperature within the reactor to a desired level without bringing about the problem of clogging, by supplying sulfuric anhydride and steam to the space by means of a separate fluid nozzles, preferably co-axial nozzles.

Further, for the withdrawal of the generated hydrofluoric acid gas, the gas flow rate in the upper space should usually be at most 3 m/sec., preferably at most 2 m/sec. If the gas flow rate is greater than that, the amount of the accompanying powdery dusts tends to increase, thus leading to troubles in the operation of the purification step.

The effects of the present invention thus described in detail are believed to be derived from the facts that the major portion of the heat required for the reaction of the fluorite with sulfuric acid in the first reactor is supplied by the heat of reaction (heat generation) by the reaction of the fluorite with sulfuric acid and steam supplied to the first reactor, whereby the heat exchange is conducted within the reactor and the supply of the heat required for the reaction can thereby be conducted smoothly. Thus, by the smooth heat exchange, the conversion of the fluorite reaches a level of at least 35% in an extremely short period of time, and the reaction products are not viscous substances. Accordingly, when this product is supplied to the second reactor, it does not deposit on the internal surface of the reactor, whereby the heat from outside can readily be conducted.

Now, the present invention will be described in further detail with reference to Examples.

EXAMPLES 1 TO 4 AND COMPARATIVE EXAMPLES 1 TO 2

As the first reactor, a horizontal reactor having an internal volume of 15 l (a width of 19.5 cm and a length of 75 cm) and equipped with a double-shaft paddle agitator was used in Examples 1 to 3 and Comparative Example 1, and a horizontal reactor having an internal volume of 10 l (a width of 19.5 cm and a length of 50 cm) and equipped with a double-shaft paddle agitator was used in Example 4 and Comparative Example 2.

Fluorite was introduced from one end, i.e. a fluorite inlet end, of each reactor towards the other end in the axial direction, while from the top of the reactor, steam, sulfuric anhydride and 98% sulfuric acid or fuming sulfuric acid were successively supplied in the proportions as shown in Table 1 at locations corresponding to the residence time of the fluorite and the reaction product being 5 minutes, 5 minutes and 10 minutes, respectively. From the other end of the reactor, an intermediate product containing the formed hydrogen fluoride gas and gypsum was withdrawn, and the intermediate product was supplied to a rotary reactor of an external heating system (the second reactor), whereby the reaction was completed.

In the first reactor, the double-shaft paddle agitator was adapted so that the upper end of the vanes is located 3 cm below the surface of the powder layer of the feed materials, and the agitator was operated at a rotational speed of the vanes of 180 rpm and at a peripheral speed of the vanes of 60 m/min. Further, the space velocity of the generated hydrogen fluoride gas above the powder layer was 1.8 m/sec.

The first reactor was insulated so that no heat exchange with the exterior took place. The second reactor was maintained at a temperature from 200° to 300° C. In the above manner, the production of hydrogen fluoride was continued for 790 hours.

The reaction temperature and the conversion in the first reactor are also shown in Table 1.

Further, after the completion of the operation, it was observed that a thin coating film comprising fluorite and the reaction product was formed on the agitator.

TABLE 1

|  | Example 1 | Example 2 | Example 3 | Example 4 | Comparative Example 1 | Comparative Example 2 |
|---|---|---|---|---|---|---|
| Feed material |  |  |  |  |  |  |
| Fluorite (kg/h) (150° C.) | 100 | 100 | 100 | 41.9 | 100 | 40.2 |
| Sulfuric acid (kg/h) (150° C.) | 91.2 | 109.3 | 85.8 | — | 73.5 | — |
| $SO_3$ gas (kg/h) (200° C., 1 atm) | 33.0 | 18.2 | 39.2 | 8.5 | 37.6 | — |
| Fuming sulfuric acid (kg/h) (200° C.) | — | — | — | (6%) 41 | — | (1%) 51.8 |
| Steam (kg/h) (200° C., 1 atm) | 5.4 | 1.9 | 7.1 | 2.1 | 70.2 | — |
| Temperature of the first reactor (°C.) | 180 | 150 | 200 | 180 | 320 | 130 |
| Conversion of the first reactor (%) | 70 | 40 | 80 | 85 | 95 | 25 |
| $\dfrac{\text{Amount of free } SO_3 \text{ in the feed material}}{\text{Theoretically required amount of } SO_3}$ (%) | 32 | 18 | 38 | 20 | 367 | 0 |
| First reactor |  |  |  |  |  |  |
| State of the solid | Granules having good flowability | Slightly wet flowable granules | Granules having good flowability | Granules having good flowability | Powder passing good flowability | Viscous paste |
| Material | Resistant material available | Resistant material available | Resistant material available | Resistant material available | Industrial resistant material hardly available | Resistant material available |
| Second reactor |  |  |  |  |  |  |
| State of the solid | Good flowability | Good flowability | Good flowability | Good flowability | Good flowability | Substantial deposition on the |

We claim:

1. A process for producing hydrogen fluoride, comprising:

reacting fluorite wih sulfuric acid, sulfuric acid anhydride and steam in a first reactor under conditions in which the temperature within the reactor is maintained within the range of 140° to 240° C. by the exothermic interaction of steam with sulfuric acid anhydride and sulfuric acid and by the steam itself while attaining a fluorite conversion level ranging from 35 to 90%; and discharging the contents of the first reactor into a second reactor where the conversion of fluorite to hdyrogen fluoride is completed.

2. The process according to claim 1 wherein the heat required for the reaction of fluorite with sulfuric acid in the first reactor is supplied by the heat of reaction generated by the reaction of the fluorite with sulfuric anhydride and steam and by the sensible heat of the feed materials, and the heat required for the reaction in the second reactor is externally supplied.

3. The process according to claim 1, wherein the reaction in the first reactor is conducted by means of an agitator provided in the reactor, said agitator being coated with a scaly film formed from materials within the reactor.

4. The process according to claim 3 wherein the agitator is not in direct contact with sulfuric acid.

5. The process according to claim 3, wherein the agitator is surrounded by a powdered layer of materials from within the reactor at least 3 mm thick around the surface of said agitator.

6. The process according to claim 3 wherein the agitator is a double-shaft paddle agitator.

7. The process according to claim 6 wherein the double-shaft paddle agitator has a vane peripheral speed of from 20 to 150 m/min.

8. The process according to claim 1 wherein the first reactor is designed so that the fluorite is supplied from its one end and the reaction product is withdrawn from its other end.

9. The process according to claim 8, wherein, the residence time of the fluorite in the first reactor is about 30 minutes, and during the time of reaction of materials within said first reactor, steam and sulfuric acid anhydride are supplied into said first reactor from the fluorite supplying end of the reactor from the very beginning of the reaction up until 15 minutes after the beginning of the reaction.

10. The process of claim 9, wherein, in addition to the supply of sulfuric acid anhydride and steam to said first reactor, sulfuric acid and/or fuming sulfuric acid are supplied into said reactor on the fluorite supplying end of the reactor during a time period starting from 3 minutes after the reaction has commenced up until 20 minutes after the reaction has commenced.

11. The process according to claim 1 wherein the sulfuric acid anhydride is supplied from fuming sulfuric acid.

12. The process of claim 1, wherein the sulfuric acid anhydride and steam are supplied into said first reactor through separate fluid nozzles.

13. The process according to claim 1 wherein the flow rate of the reaction product gas flowing in the upper space in the first reactor is at most 3 m/sec.

14. The process according to claim 1 wherein sulfuric acid and/or fuming sulfuric acid is supplied to the surface formed by the feed materials and/or the reaction product at a supply rate of from 500 to 5000 kg/m$^2$.hr.

* * * * *